US012404697B2

(12) United States Patent
Qiu

(10) Patent No.: US 12,404,697 B2
(45) Date of Patent: Sep. 2, 2025

(54) LATCH BOLT INSTALLATION STRUCTURE AND DOOR LOCK USING SUCH STRUCTURE

(71) Applicant: CMECH (GUANGZHOU) LTD., Guangdong (CN)

(72) Inventor: Jia Sen Qiu, Guangdong (CN)

(73) Assignee: CMECH (GUANGZHOU) LTD., Guangdong (CN)

( * ) Notice: Subject to any disclaimer, the term of this patent is extended or adjusted under 35 U.S.C. 154(b) by 0 days.

(21) Appl. No.: 18/339,862

(22) Filed: Jun. 22, 2023

(65) Prior Publication Data

US 2023/0332431 A1 Oct. 19, 2023

Related U.S. Application Data

(63) Continuation of application No. 17/249,326, filed on Feb. 26, 2021, now Pat. No. 12,024,919.

(30) Foreign Application Priority Data

Jul. 1, 2020 (CN) ........................ 202010619727.3
Jul. 1, 2020 (CN) ........................ 202010622272.0
(Continued)

(51) Int. Cl.
*E05B 13/00* (2006.01)
*E05B 1/00* (2006.01)
(Continued)

(52) U.S. Cl.
CPC ............ *E05B 13/004* (2013.01); *E05B 1/003* (2013.01); *E05B 3/003* (2013.01); *E05B 3/065* (2013.01);
(Continued)

(58) Field of Classification Search
CPC ................ E05B 63/044; E05B 15/102; E05B 2015/105; E05B 13/004; E05B 1/003;
(Continued)

(56) References Cited

U.S. PATENT DOCUMENTS 168,986 A * 10/1875 Griscom ............... E05B 63/044 292/245
2,516,991 A * 8/1950 Heyer ..................... E05B 55/12 70/151 R
(Continued)

FOREIGN PATENT DOCUMENTS

AU 2004229071 B2 6/2005
CA 2254164 A 6/1999
(Continued)

*Primary Examiner* — Christine M Mills
*Assistant Examiner* — Faria F Ahmad
(74) *Attorney, Agent, or Firm* — McKee, Voorhees & Sease, PLC

(57) ABSTRACT

The present invention relates to the field of lockset and provides a lock body a latch bolt installation structure comprising a latch bolt body having a driving part and a latch part, wherein the latch part is detachably connected with the driving part. The latch part is configured with a male part inserting into a female part on the driving part; the female part comprises a first installation position and a second installation position for installing the latch part; when the latch part is installed at the first installation position, a flat surface of the latch part faces towards a first direction; when the latch part is installed at the second installation position, the flat surface of the latch part faces towards a second direction which is opposite to the first direction. The present invention is advantageous in fast reversal of the installation of the latch bolt as well as the construction progress control and user experiences.

22 Claims, 3 Drawing Sheets

(30) Foreign Application Priority Data

Jul. 1, 2020 (CN) ......................... 202010622790.2
Sep. 30, 2020 (CN) ......................... 202011060664.9

(51) Int. Cl.

| | |
|---|---|
| ***E05B 3/00*** | (2006.01) |
| ***E05B 3/06*** | (2006.01) |
| ***E05B 15/04*** | (2006.01) |
| ***E05B 63/04*** | (2006.01) |
| ***E05B 63/08*** | (2006.01) |
| ***E05B 63/14*** | (2006.01) |
| ***E05C 1/08*** | (2006.01) |
| ***E05C 9/04*** | (2006.01) |

(52) U.S. Cl.
CPC ............ *E05B 15/04* (2013.01); *E05B 63/044* (2013.01); *E05B 63/14* (2013.01); *E05C 1/085* (2013.01); *E05C 9/04* (2013.01); *E05B 2001/0076* (2013.01); *E05B 2015/0406* (2013.01); *E05B 63/08* (2013.01); *E05B 63/146* (2013.01); *E05Y 2900/132* (2013.01)

(58) Field of Classification Search
CPC .......... E05B 3/003; E05B 15/04; E05B 63/14; E05B 63/08; E05B 2015/0406; E05C 1/085; E05C 9/04; Y10T 292/1097; Y10T 292/0969
See application file for complete search history.

(56) References Cited

U.S. PATENT DOCUMENTS 2,661,972 A 12/1953 Schlage
3,316,003 A 4/1967 Russell et al.
3,361,464 A * 1/1968 Foster .................. E05B 63/044 292/165
4,243,256 A 1/1981 Frydrych
4,516,798 A 5/1985 Bergen
4,548,432 A 10/1985 Bengtsson
4,854,618 A 8/1989 Webster
4,988,133 A * 1/1991 Shih ..................... E05B 63/044 292/191
5,123,684 A 6/1992 Yeh
5,301,525 A 4/1994 Doring
5,495,731 A 3/1996 Riznik
5,678,870 A * 10/1997 Pelletier ................. E05B 55/12 292/169.16
5,707,090 A 1/1998 Sedley
6,045,169 A 4/2000 Frolov
6,209,883 B1 4/2001 Kashmerick et al.
6,209,893 B1 4/2001 Ferris
6,209,931 B1 4/2001 Von Stoutenborough et al.
6,289,704 B1 9/2001 Collet et al.
6,349,982 B2 2/2002 Fayngersh et al.
6,393,878 B1 5/2002 Fayngersh et al.
6,622,535 B2 9/2003 Chiang et al.
7,108,300 B2 * 9/2006 Hodgin ................ E05B 63/044 70/462
7,510,222 B2 3/2009 Hodgin et al.
8,366,158 B2 * 2/2013 Chen .................... E05B 63/044 292/DIG. 60
8,371,627 B2 2/2013 Chiang et al.
8,397,548 B1 * 3/2013 Lin ...................... E05B 63/044 70/462
8,474,884 B2 7/2013 Helisten et al.
8,523,247 B2 9/2013 Talpe
8,523,249 B2 9/2013 Hodgin et al.
8,540,288 B2 9/2013 Tsai
8,702,131 B1 4/2014 Gianoli et al.
10,890,020 B2 1/2021 Moon et al.
11,124,992 B2 9/2021 Moon et al.
11,505,973 B2 11/2022 Xin et al.
11,572,706 B2 2/2023 Qiu
11,639,618 B2 * 5/2023 Riley ................... E05B 63/044 292/157
2002/0104339 A1 8/2002 Saner
2004/0169378 A1 9/2004 Hodgin et al.
2005/0092042 A1 5/2005 Constantinou et al.
2005/0103066 A1 5/2005 Botha et al.
2007/0114800 A1 5/2007 Kuo
2008/0042452 A1 2/2008 Moon et al.
2009/0282877 A1 11/2009 Laverty et al.
2011/0210566 A1 9/2011 Chen
2012/0000257 A1 1/2012 Wheeler et al.
2017/0030112 A1 2/2017 Kane
2017/0275917 A1 9/2017 Murphy et al.
2022/0010594 A1 1/2022 Qiu

FOREIGN PATENT DOCUMENTS

| | | | |
|---|---|---|---|
| CN | 110630113 | A | 12/2019 |
| CN | 111101764 | A | 5/2020 |
| DE | 3605826 | A1 | 2/1986 |
| DE | 4014041 | A1 | 5/1990 |
| DE | 9321445 | U1 | 2/1993 |
| DE | 20218956 | U1 | 12/2002 |
| EP | 358971 | A2 | 3/1990 |
| EP | 454958 | A1 | 11/1991 |
| EP | 454965 | A1 | 11/1991 |
| EP | 1091064 | A2 | 10/2000 |
| EP | 1533452 | A2 | 5/2005 |
| EP | 1857617 | A2 | 11/2007 |
| EP | 1865132 | A1 | 12/2007 |
| EP | 2503080 | A1 | 9/2012 |
| EP | 3045625 | B1 | 11/2017 |
| EP | 3336284 | A1 | 6/2018 |
| EP | 3438384 | A1 | 7/2018 |
| EP | 3216953 | B1 | 10/2018 |
| ES | 2324383 | A1 | 8/2009 |
| FR | 2836505 | A1 | 8/2003 |
| FR | 2941544 | A3 | 7/2010 |
| FR | 3028547 | A1 | 5/2016 |
| GB | 265355 | | 10/1926 |
| GB | 2230551 | A | 10/1990 |
| GB | 2480258 | A | 11/2011 |
| KR | 101876126 | B1 | 4/2017 |
| KR | 102042596 | B1 | 11/2019 |
| WO | 02072985 | A1 | 9/2002 |
| WO | 2006114660 | A1 | 11/2006 |
| WO | 2007027176 | A1 | 3/2007 |
| WO | 2008094472 | A2 | 8/2008 |
| WO | 2015058253 | A1 | 4/2015 |
| WO | 2019033147 | A1 | 2/2019 |

* cited by examiner

LATCH BOLT INSTALLATION STRUCTURE AND DOOR LOCK USING SUCH STRUCTURE

PRIORITY CLAIMS AND INCORPORATION OF RELATED APPLICATIONS

This application is a continuation application of U.S. Ser. No. 17/249,326, filed Feb. 26, 2021, which claims priority to the following four Chinese applications, and incorporate by reference their related pending US applications in their entireties:

(A) Chinese application 202011060664.9, filed Sep. 30, 2020;

(B) Chinese application 202010622272.0, filed Jul. 1, 2020 and U.S. Ser. No. 17/249,314, filed Feb. 26, 2021, MVS Ref No. P13399US00;

(C) Chinese application 202010619727.3, filed Jul. 1, 2020, and U.S. Ser. No. 17/249,308, filed Feb. 26, 2021, MVS Ref No. P13400US00; and (D) Chinese application 202010622790.2, filed Jul. 1, 2020, and U.S. Ser. No. 17/249,299, filed Feb. 26, 2021, MVS Ref No. P13437US00.

FIELD OF THE INVENTION

The following relates to the field of lockset, and more particularly to a latch bolt installation structure and door lock using the same.

BACKGROUND OF THE INVENTION

A multipoint lock with shootbolts is a lock capable of ejecting both top and the bottom shootbolts (i.e. the top lock and the bottom lock) when being locked up. The multipoint lock with top and bottom shootbolts works in the following principle: to open door, first turn the lock cylinder with a key to retract the deadbolt, then press or rotate the lever handle downwardly to retract the latch bolt, as well as the top and the bottom shootbolts by the driving lever simultaneously, thereby the door can be swung open. After opening the door, the lever handle is released to restore to its original position, and the latch bolt will extend laterally from the edge of the door. When the door is closed, to lock the door, first push or rotate the lever handle upwardly to eject or extend the top and the bottom shootbolts via the driving lever, then turn the lock cylinder with a key or an interior knob to extend the deadbolt, thereby locking the door on the lateral edge and on the top and bottom edges. Then the lever handle is released to restore to its original position. As the door is locked by the top and the bottom shootbolts, deadbolt and the latch bolt all together, the safety is well improved.

However, for the multipoint lock in the prior art, the latch bolt is likely to be installed backwards or in an unqualified way for a specific application after the lock is assembled, causing the assembled main lock to be unavailable for use. A traditional technical solution is to disassemble the lock and reinstall it, which takes a lot of trouble. Moreover, as the internal structure of the multipoint lock gets more and more precise through the constant development of the lockset, disassembly and reassembly may lead to faults of the lock in later use, incurring unnecessary costs and affecting the construction progress as well as user experiences.

SUMMARY OF THE INVENTION

It is an objective of the invention to provide a latch bolt installation structure and door lock using the same to solve the problems above, thereby achieving convenient adjustment for the installation of the latch bolt and facilitating progress control and improving user experiences.

The objective is achieved by the following technical solutions:

A latch bolt installation structure allows reversible assembly and comprises a latch bolt body having a driving part and a latch part, wherein the latch part is detachably connected with the driving part.

The latch part is configured with a male part inserting into a female part on the driving part; the female part comprises a first installation position and a second installation position for installing the latch part; when the latch part is installed at the first installation position, a flat surface of the latch part faces towards a first direction; and when the latch part is installed at the second installation position, the flat surface of the latch part faces towards a second direction which is opposite to the first direction.

Preferably, an elastic-engaging mechanism is provided in the driving part, for engaging with the male part. The elastic-engaging mechanism comprises an engaging block, wherein the engaging block may be moved by an elastic force to engage with the male part by inserting into a recess configured on the male part.

Preferably, the moving direction of the engaging block under the elastic force is perpendicular to the moving direction of the male part inserting into the driving part.

Preferably, an adjusting mechanism is further provided in the driving part, for cooperating with the elastic-engaging mechanism, wherein the adjusting mechanism moves the engaging block against the elastic force to release the male part, allowing the latch part to be detached.

Preferably, the adjusting mechanism comprises an adjusting channel configured in the driving part for receiving an external feature or tool, a contacting portion configured in the engaging block for contacting with the external feature or tool, wherein an external feature or tool may reach to the contacting portion through the adjusting channel; the height adjustment range by the external feature or tool is no less than the insertion depth of the engaging block in the recess.

Preferably, the cross-section of the male part is in the shape of one of circle, oval, or polygon.

Preferably, the male part is a cylindrical structure on the latch part, and a limit stop is provided at the side of the latch part where the male part is arranged, and a corresponding limit groove is provided at the driving part for receiving the limit stop.

Preferably, the male part has a guiding surface for smoothly inserting into the female part.

A door lock, comprising the above-said latch bolt installation structure, provides easy installation on a door in either a left hand or right hand application.

Preferably, the door lock comprising the above-said latch bolt installation structure further comprises a lock body, wherein an adjusting hole is provided on the lock body for communicating with the adjusting channel.

As compared with the prior art, the present invention has following technical advantages:

In present invention, the driving part and the latch part of the latch bolt body are detachably connected with each other by a male part on the latch part inserting into a female part on the driving part; the female part comprises a first installation position and a second installation position for installing the latch part in different directions, such that the latch part can be reversed without disassembling and reassembling the lock, which greatly simplifies the adjustment process where there is a need for reversely installing the latch bolt for specific left or right hand applications. In this way, the present invention avoids processes of disassembling and reassembling the lock as in traditional solutions, which reduces the cost, prevents failures that may occur during disassembly and reassembly, and ensures better user experiences.

BRIEF DESCRIPTION OF THE DRAWINGS

The present invention will be described hereinafter in details with reference to the figures and the embodiments for the sake of better understanding. Any non-substantive, obvious alterations or improvement by the technician of this technical field according to the present invention may be incorporated into ambit of the claims of the present invention.

LIST OF REFERENCE CHARACTERS

1 Latch Bolt Body
11 Driving Part
111 Female Part
112 Limit Groove
113 Flat Surface
12 Latch Part
1210 Limit Stop
121 Male Part
1211 Recess
1212 Guiding Surface
13 Elastic-engaging Mechanism
131 Engaging Block
132 Spring
14 Adjusting Mechanism
141 Adjusting Channel
142 Contacting Portion
2 Lock Body
21 Adjusting Hole

DETAILED DESCRIPTION OF THE PREFERRED EMBODIMENTS

The present invention will be described hereinafter in details with reference to the figures and the embodiments for the sake of clarity. It should be noted that the embodiments of the present invention and the features in different embodiments may be combined if they do not conflict each other. Although certain embodiments are described in detail for a better understanding, it should be understood that there may be more embodiments. Various changes and modifications may be obtained by those skilled in the art on the basis of the present invention without creative works and without departing the scope of the claims.

The technical terms used herein have the general meanings well understood by those skilled in the art unless otherwise defined. The terms in the description of the present invention have been presented for purposes of illustrating the embodiments, not limiting the present invention.

Embodiment

Figure 1:
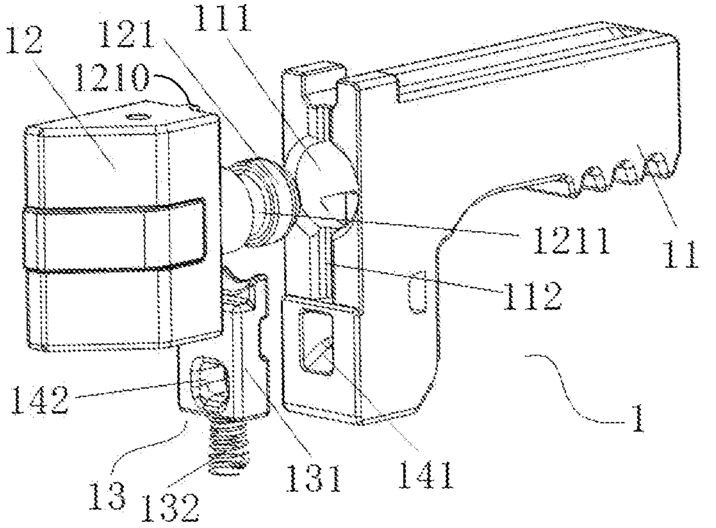
FIG. 1 is an exploded view of the latch bolt body according to the present invention.
Figure 2:
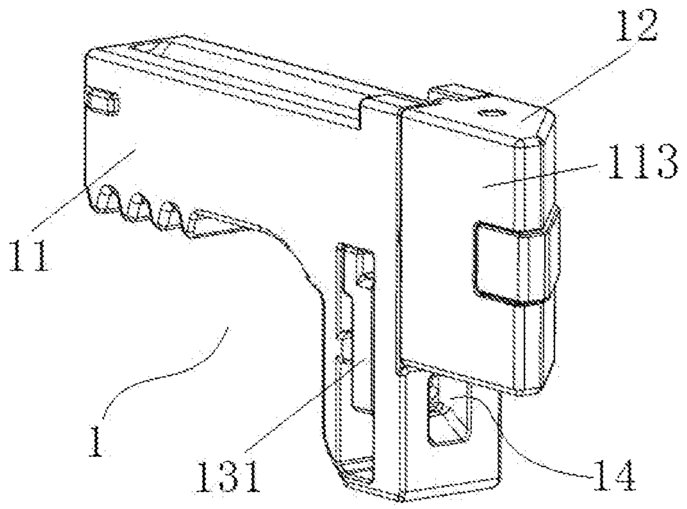
FIG. 2 is a perspective view of the assembled latch bolt body according to the present invention.
Figure 3:
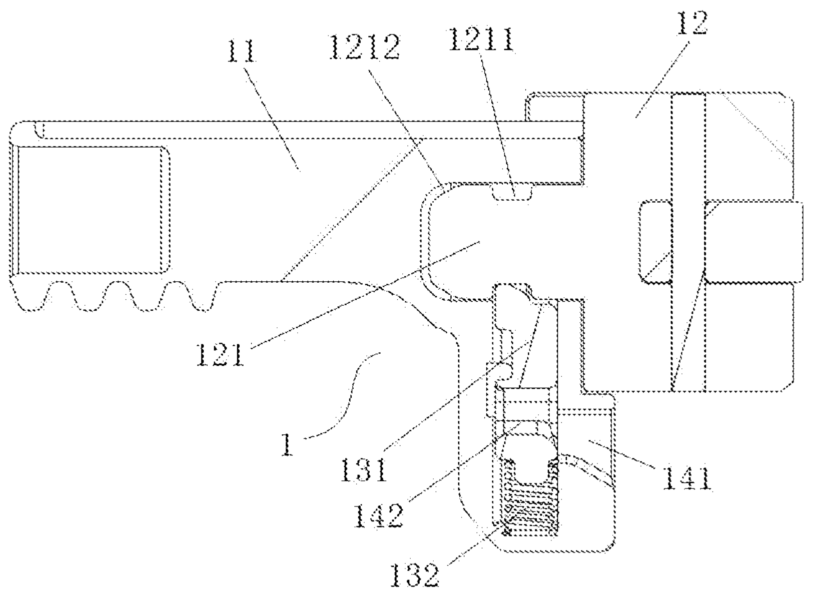
FIG. 3 is a cross-section of the latch bolt body taken along a centered vertical plane, according to the present invention.
Figure 4:
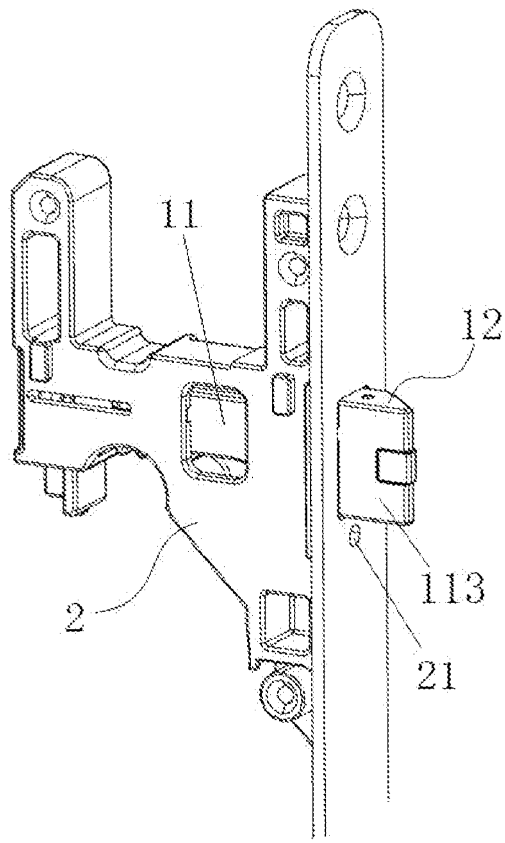
FIG. 4 is a perspective view illustrating the latch bolt body installed in a lock according to the present invention.
Figure 5:
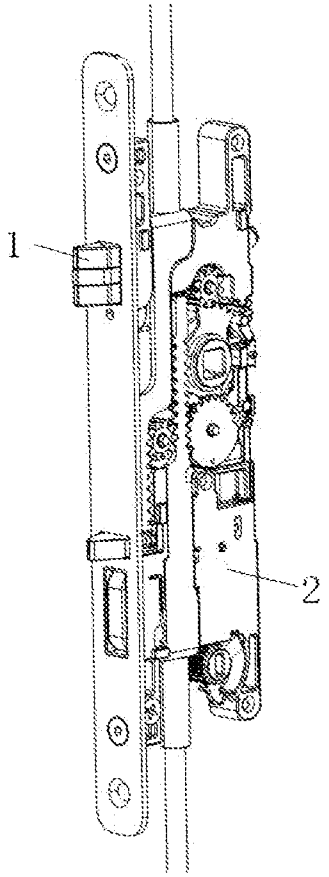
FIG. 5 is a schematic view illustrating the interior structure of the door lock having the latch bolt body, according to the present invention.

As shown in FIGS. 1 to 5, an embodiment according to the present invention provides a latch bolt installation structure, comprising a latch bolt body 1 having a driving part 11 and a latch part 12, wherein the latch part 12 is detachably connected with the driving part 11, In use, the driving part 11 is arranged inside a lock body 2 of a multipoint lock, and the latch part 12 is arranged at one side of the driving part 11 and moves in and out of the lock body 2.

Further, the latch part 12 is configured with a male part 121 inserting into a female part or opening 111 on the driving part 11. The female part 111 comprises a first installation position and a second installation position for installing the latch part 12. When the latch part 12 is installed at the first installation position, the flat surface 113 of the latch part 12 faces towards a first direction, which is called forward installation; and when the latch part 12 is installed at the second installation position, the flat surface 113 of the latch part 12 faces towards a second direction which is opposite to the first direction, which is called reverse installation. In this embodiment, the latch part 12 is installed at the first installation position and is forward installed; the reverse installation is operated by flipping the latch part 12 horizontally, that is rotating the latch part 12 180 degrees around the axis of the male part 121.

As one embodiment of the present invention, the female part 111 is configured to have a shape matched with the shape of the male part 121, for example, they are both in the shape of a circle, an oval, or centrosymmetric polygon; in this way, the male part 121 could be inserted into the female part 111 regardless of whether the latch part 12 is installed at the first installation position or flipped horizontally to the second installation position, allowing the latch part 12 to be turned over without disassembling the lock body 2. Preferably, an anti-falling feature, for example a snap fit feature is further provided between the male part 121 and the female part 111 for preventing the latch part 12 from falling out of the driving part 11, The specific structure of the anti-falling feature may be in any available form in the prior art, which will not be explained in detail here.

As another embodiment of the present invention, the female part 111 may not strictly matched with the male part 121 as long as the female part 111 is big enough to receive the male part 121, and the latch part 12 is fixed or restrained by other features. In this case, the cross-section of the male part 121 may be in the shape of one of circle, oval, or polygon.

Specifically, an elastic-engaging mechanism 13 is provided in the driving part 11, for engaging with the male part 121. The elastic-engaging mechanism 13 comprises an engaging block 131 and a spring 132, wherein the engaging block 131 may be forced by the spring 132 to move to engage with the male part 121 by inserting into a recess 1211 configured on the male part 121, in order to prevent the latch part 12 from falling off during use. Preferably, the moving direction of the engaging block 131 is perpendicular to the moving direction of the male part 121 inserting into the driving part 11, such that the engaging block 131 and the male part 121 are firmly engaged together, moreover, such arrangement helps to optimize layout of interior space, making the lock body 2 more impact. Thus, the block 131 functions like a spring biased detent.

An adjusting mechanism 14 is further provided in the driving part 11, for cooperating with the elastic-engaging mechanism 13. The adjusting mechanism 14 moves the engaging block 131 against the elastic force to release the male part 121, allowing the latch part 12 to be detached.

Preferably, the adjusting mechanism 14 comprises an adjusting channel 141 configured in the driving part 11 for receiving an external feature or tool, a contacting portion 142 configured in the engaging block 131 for contacting with the external feature or tool, wherein the external feature or tool may reach to the contacting portion 142 through the adjusting channel 141. The height adjustment range by the external feature or tool is no less than the insertion depth of the engaging block 131 in the recess 1211. The external feature or tool may be a straight bar or screwdriver, for example, with one end of the straight bar inserted into the adjusting channel 141 and reaching to the contacting portion 142, and then forcing the engaging block 131 to move against the elastic force, in this way, the engaging block 131 will depart from the male part 121.

The adjusting mechanism 14 provided in this embodiment is able to control the engagement between the engaging block 131 and the male part 121 by providing a channel. The adjusting mechanism 14 has the advantage of simplicity and skillful design and cost saving without adversely affecting the structure of the lock body.

Further, the male part 121 provided in this embodiment is a cylindrical structure on the latch part 12, which is easy to be processed and formed; a limit stop 1210 is provided at the side of the latch part 12 where the male part 121 is arranged, and a corresponding limit groove 112 is provided at the driving part 11 for receiving the limit stop 1210, such that the latch part 12 cannot rotate when the limit stop 1210 inserts into the limit groove 112.

Preferably, the male part 121 has a frustum cone-like guiding surface 1212 for smoothly inserting into the female part 111, such that the male part 121 could achieve engagement with the engaging block 131.

The embodiment further provides a door lock comprising the above-mentioned latch bolt installation structure and the lock body 2. Preferably, an adjusting hole 21 is provided on the lock body 2 for communicating with the adjusting channel 141, which allows an external feature or tool to insert and therefore adjust the latch part 12.

The embodiment described hereinbefore is merely preferred embodiment of the present invention and not for purposes of any restrictions or limitations on the invention. It will be apparent that any non-substantive, obvious alterations or improvement by the technician of this technical field according to the present invention may be incorporated into ambit of claims of the present invention.

What is claimed is:

1. A latch bolt assembly for a door, comprising:
- a body adapted to be mounted in a mortise of the door;
- a latch extendable from and retractable into the body in opposite axial directions, and having a male member;
- a driving part in the body to move the latch between retracted and extended positions, and having a female member;
- the male member movable in the axial direction to couple with the female member for selective positioning of the latch in opposite forward and rearward directions; and
- a retention member engaging the male member to retain the male member in the forward and rearward directions, and disengaging the male member to allow the male member to be reversed for movement between the forward and rearward directions without disassembling the male member from the female member.

2. The latch bolt assembly of claim 1 wherein the retention member moves in a direction perpendicular to retraction and extension directions of the latch.

3. The latch bolt assembly of claim 1 wherein the male member includes a recess for receiving the retention member.

4. The latch bolt assembly of claim 1 further comprising a spring to bias the retention member into engagement with the male member.

5. The latch bolt assembly of claim 1 wherein the driving part includes a channel for receiving a tool to disengage the retention member from the male member.

6. The latch bolt assembly of claim 5 wherein the body includes an opening for the tool to reach the retention member while the body is mounted in the door.

7. The latch bolt assembly of claim 1 wherein the latch moves horizontally and the retention member moves vertically.

8. The latch bolt assembly of claim 1 wherein the latch moves horizontally and rotates about a horizontal axis.

9. The latch bolt assembly of claim 1 further comprising a stop member on the male member and a groove on the driving part to receive the stop member and align the latch in the forward and rearward directions.

10. A method of installing a latch bolt in a door, comprising:
- mounting a latch body into a mortise in the door, the latch body including a latch normally extending out of the door in a first position to retain the door in a closed position, and the latch being retractable into door to allow the door to be opened;
- rotating the latch in the first position about a horizontal axis to opposite forward and rearward positions while the latch body is in the door; and
- retaining the latch in a selected one of the forward and rearward positions.

11. The method of claim 10 further comprising moving the latch between the extended and retracted positions with a latch driver on the latch body.

12. The method of claim 11 wherein the latch driver includes a female member and the latch includes a male member received axially in the female member, and the method further comprising rotating the male member in the female member to change the latch between the forward and rearward positions.

13. The method of claim 10 further comprising biasing a retention member in the latch body into engagement with the latch to retain the latch in the selected position.

14. The method of claim 13 further comprising inserting a tool through a hole in the latch body to overcome the bias on the retention member and thereby allow the male member to be rotated relative to the female member.

15. The method of claim 10 further comprising releasing the latch from the selected position by inserting a tool through a hole in the latch body.

16. The method of claim 10 further comprising moving the latch horizontally between the extended and retracted positions.

17. The method of claim 10 further comprising rotating the latch about a horizontal axis between the forward and rearward positions.

18. A latch bolt assembly for a door, comprising:
- a latch body adapted to be mounted in the door;
- a latch in the latch body and being moveable horizontally between a first extended position to retain the door closed and a second retracted position to allow the door to open, and being rotatable about a horizontal axis between forward and rearward positions while the latch is in the first extended position.

19. The latch bolt assembly of claim 18 further comprising a retention member in the latch body to hold the latch in the forward and rearward positions.

20. The latch bolt assembly of claim 19 further comprising a tool insertable through a hole in the latch body to disengage the retention member from the latch.

21. The latch bolt assembly of claim 1 wherein the latch is adapted to retain the door in a closed position when the latch is in the extended position, and the latch is adapted to allow the door to open when in the retracted position, and the latch being rotatable between the forward and rearward positions when in the extended position.

22. The latch bolt assembly of claim 18 wherein the latch includes a male member coupled to a female member by movement along the horizontal axis.

* * * * *